US012809350B2

(12) United States Patent
Kato

(10) Patent No.: US 12,809,350 B2
(45) Date of Patent: Nov. 24, 2026

(54) INFORMATION PROCESSING FOR OUTPUTTING COMPREHENSIVE DETERMINATION RESULT ON THE BASIS OF A PLURALITY OF DETERMINATION MATERIALS

(71) Applicant: PLM REVOLUTION CO., LTD., Kanagawa (JP)

(72) Inventor: Koji Kato, Kanagawa (JP)

(73) Assignee: PLM REVOLUTION CO., LTD., Kanagawa (JP)

( * ) Notice: Subject to any disclaimer, the term of this patent is extended or adjusted under 35 U.S.C. 154(b) by 489 days.

(21) Appl. No.: 18/251,829

(22) PCT Filed: Oct. 11, 2021

(86) PCT No.: PCT/JP2021/038844
§ 371 (c)(1),
(2) Date: May 4, 2023

(87) PCT Pub. No.: WO2022/107539
PCT Pub. Date: May 27, 2022

(65) Prior Publication Data

US 2023/0409009 A1 Dec. 21, 2023

(30) Foreign Application Priority Data

Nov. 17, 2020 (JP) ................................ 2020-201350

(51) Int. Cl.
*G05B 19/418* (2006.01)

(52) U.S. Cl.
CPC ... *G05B 19/4183* (2013.01); *G05B 19/41865* (2013.01)

(58) Field of Classification Search
None
See application file for complete search history.

(56) References Cited

U.S. PATENT DOCUMENTS 7,475,472 B2 * 1/2009 Haarberg ......... G05B 19/41805 29/564
7,966,588 B1 * 6/2011 Perry .................... H02M 3/156 716/139

(Continued)

FOREIGN PATENT DOCUMENTS

JP 6736733 B 7/2020
JP 2020-173491 A 10/2020

OTHER PUBLICATIONS

International Search Report issued in Application No. PCT/JP2021/038844, Mailed Jan. 25, 2022.

*Primary Examiner* — Howard Cortes
(74) *Attorney, Agent, or Firm* — Michael Best & Friedrich LLP

(57) ABSTRACT

This invention computerizes work requiring a "determination" that reflects all requests for each of a plurality of determination materials. A table 011 that associates "a combination of determination grounds information" and "determination result information" is formed by making use of: the fact that determination result information is information of a limited scope according to the purpose and the content of determination work; and the fact that a feature, performance, price, application or the like included in the determination result information, which serve as "grounds" for making a determination, are used as a "combination of determination grounds information", which makes it possible to identify the determination result information. In addition, on the basis of a determination material importance set in a table 012 and the determination grounds information and the importance setting for each of the determination materials, a "combination of determination grounds information" is generated; a process 013 is executed for reordering combinations in the selection priority order; a process 014 is executed for searching for a "combination of deter- (Continued)

mination grounds information" in the table 011 on the basis of the generated information; and associated "determination result information" is thus referenced and a result 015 is output.

2 Claims, 17 Drawing Sheets

(56) References Cited

U.S. PATENT DOCUMENTS

| | | | | |
|---|---|---|---|---|
| 8,935,646 | B2 * | 1/2015 | Whitford | G06F 30/13 716/119 |
| 9,501,608 | B1 * | 11/2016 | Allen | G01R 31/31725 |
| 10,152,566 | B1 * | 12/2018 | Nagarandal | G06F 30/347 |
| 10,234,846 | B2 * | 3/2019 | Jäger | G06Q 10/067 |
| 2006/0212283 | A1 * | 9/2006 | Ichikawa | F16C 19/00 703/22 |
| 2011/0320175 | A1 * | 12/2011 | Perry | G06F 30/00 703/1 |
| 2011/0320848 | A1 * | 12/2011 | Perry | G06F 30/327 713/340 |
| 2015/0128102 | A1 * | 5/2015 | Perry | G06F 30/392 716/137 |
| 2016/0253448 | A1 * | 9/2016 | Ogawa | H05K 3/0005 716/136 |
| 2017/0318716 | A1 * | 11/2017 | Pfaffinger | G05B 19/4097 |
| 2020/0302102 | A1 * | 9/2020 | Alam | G06F 30/367 |

* cited by examiner

Fig. 4

A Work Environment and Determination Materials for PCB to be Designed in an Embodiment

| | |
|---|---|
| Division Code | wd |
| Department Code | e_des1 |
| PCB CAD Component Number Selection Function Code | macsel |
| PCB CAD system ID to be used | pcad1 |

041 042

| Determination Material | Determination Material Configuration Code | Comments |
|---|---|---|
| Soldering Section | R/D<br>(Reflow / DIP) | · Method of Components Mounting by Reflow Soldering on A side of PCB and by DIP Soldering on B side thereof |
| Plate Making Section | PHT<br>(Photographic Process) | · Form the Pattern on PCB and Solder Mask with high accuracy by Method of Forming Etching Resist and Solder Mask by Dry Film or Liquid Resist Coating, Exposure and Developing |
| Mounting Density Section | MT-H<br>(Mounting Density - High) | · PCB Design Standard aiming at increasing number of components mounted per unit PCB area by minimizing components spacing as much as possible. This High-Density Mounting Standard can be used only when Constraints such as PCB Material, Size, and Mounting Machine Performance at Production Site, etc. are Satisfied. |
| Component Through Section | T<br>(Component Though Is Usable) | · Expected to Prevent Solder Bridges during DIP by Reducing the Size of Land and Ensure the Peel Strength, when Lead Components are Mounted on Copper Through-Hole PCB |

Fig. 5

Table 031 (Association between Operation Management Unit and Operation Generation)

| Division Code (051) | Department Code (052) | Update Section (053) | Operation Generation (054) | Comments |
|---|---|---|---|---|
| wd | e_des1 | 0 | edes_001 | · Setting at the Start of Operation |
| wd | e_des1 | 1 | edes_002 | · Introducing High-Density Mounting Standard and Mounting Area Check Function of PCB CAD<br>· Pre-introduction Test on pcad2<br>· Test Introduction of PCB Mounting Check Function<br>· Test Introduction of File Output Decision Processing<br>· Test Introduction of Capturing 3D Components in PCB CAD File and Interference Check Function |
| wd | e_des2 | 0 | edes_001 | · Setting at the Start of Operation |
| wd | e_des3 | 0 | edes_001 | · Setting at the Start of Operation |
| wd | e_des3 | 1 | edes_003 | · Test Introduction of Selection Processing and PCB CAD Check by Adding Data for Angle Check to PCB CAD Component that Require Attention to DIP Direction |
| wd | e_des4 | 0 | edes_001 | · Setting at the Start of Operation |
| wd | me_des1 | 0 | mdes_001 | · Setting at the Start of Operation |
| wd | me_des1 | 1 | mdes_002 | · Change Settings for Using New Functions of 3D-CAD |
| wd | e_manage | 0 | mana_001 | · Setting at the Start of Operation |
| wd | e_manage | 1 | mana_002 | · Setting for Operation Improvement Test due to Renewal of A site Production Facility |
| wd | e_manage | 2 | mana_003 | · Setting for New Function Introduction Test of PCB CAD2 |
| ⋮ | ⋮ | ⋮ | ⋮ | ⋮ |

Fig. 6

Table 032 (Association between Function Generation and Function Setting)

| Operation Generation (054) | Function Code (061) | Function Generation (062) | Setting Switching Section (063) | Setting Contents (064) | Comments of Function | Function Setting Overall Code (065) | Comments of Setting Contents |
|---|---|---|---|---|---|---|---|
| edes_001 | bomcre | 0 | def | Standard | Creation of BOM from Schematic | bomcre01s | · Setting at the Start of Operation |
| edes_001 | bomcre | 0 | sel | Cost Focused | Creation of BOM from Schematic | bomcre01c | · Setting at the Start of Operation |
| edes_001 | macsel | 0 | — | — | PCB CAD Component Number Selection from BOM | macsel001 | · Setting at the Start of Operation |
| edes_001 | ppsel | 0 | — | — | Physical Property Data Selection for Structure Analysis | ppsel001 | · Setting at the Start of Operation |
| edes_001 | tfasel | 0 | — | — | File Selection Applicable for Thermal Fluid Analysis | tfasel001 | · Setting at the Start of Operation |
| edes_002 | bomcre | 0 | — | — | Creation of BOM from Schematic | bomcre01 | · Setting at the Start of Operation |
| edes_002 | bomcre | 1 | — | — | Creation of BOM from Schematic | bomcre02 | [Minor change to maintain operation generation] Modification of Determination Grounds Information and its Importance Setting Corresponding to Supplier & Cost Change |
| edes_002 | macsel | 0 | — | — | PCB CAD Component Number Selection from BOM | macsel002 | · Additional Setting of Determination Grounds Information for Selecting PCB CAD components with Mounting Check Areas Corresponding to High-Density Mounting Standards and PCB CAD Mounting Area Check Function<br>· Pre-introduction Test on pcad2 |
| edes_002 | mtchk | 0 | — | — | PCB Mounting Check | mtchk001 | · Introduction Test<br>(Note) There is a Check Using PCB CAD Component Number, and the Check Setting is Linked with Function "macsel" by Function Setting Overall Code (mtchk001). |
| edes_002 | outchk | 0 | — | — | File Output Determination | outchk001 | · Introduction Test |
| edes_002 | 3dinp | 0 | — | — | Capturing 3D-CAD components and Interference Check | 3dinp001 | · Introduction Test |
| edes_002 | ppsel | 0 | — | — | Physical Property Data Selection for Structure Analysis | ppsel001 | · Setting at the Start of Operation |
| edes_002 | tfasel | 0 | — | — | File Selection Applicable for Thermal Fluid Analysis | tfasel001 | · Setting at the Start of Operation |
| ⋮ | ⋮ | ⋮ | ⋮ | ⋮ | ⋮ | ⋮ | ⋮ |

Fig. 7

Table 033 (Association between Function Setting and Process)

| Function Setting Overall Code (065) | Process Code (071) | Process Setting (072) | Process Setting (073) | Process Setting (074) | Comments to be Processed | Comments of Setting Status |
|---|---|---|---|---|---|---|
| macsel001 | jcsettbl | dbsvr1 | TABLE012 | jcset01 | Table for Setting Determination Material Configuration Code Importance and Determination Grounds Information Importance | · Determination Material Settings at the Start of Operation |
| | jritbl | dbsvr1 | TABLE011 | – | Association Table between Combinations of Determination Grounds Information and Determination Result Information | · Setting at the Start of Operation |
| | pcadlib | pcad1 | pcad1_lib | – | PCB CAD1 Library | · Library Used at the Start of Operation |
| | pcadbin | pcad1 | pcad1_set01.exe | | PCB CAD1 System Setting | · Initial Function Settings at the Start of Operation |
| macsel002 | jcsettbl | dbsvr1 | TABLE012 | jcset02 | Table for Setting Determination Material Configuration Code Importance and Determination Grounds Information Importance | · Addition of Determination Grounds Information for PCB CAD Component Selection that Meet High-Density Design Standards |
| | jritbl | dbsvr1 | TABLE011 | – | Association Table between Combinations of Determination Grounds Information and Determination Result Information | · Additional Settings for Each Registration of PCB CAD Components |
| | pcadlib | pcad1 | pcad1_lib | – | PCB CAD1 Library | · Library used at the Start of Operation |
| | pcadlib | pcad2 | pcad2_lib | – | PCB CAD2 Library | · Library for Pre-Introduction Test on pcad2 |
| | pcadbin | pcad1 | pcad1_set02.exe | -----0--- | Server for PCB CAD1 | · Setting Processing of High-Density Mounting Area Check Function |
| | pcadbin | pcad2 | pcad2_set01.exe | – | Server for PCB CAD2 | · Initial Function Settings for Pre-Introduction Test on pcad2 |
| | dataref | dbsvr3 | refdata | (s) Operation Generation 054 | Reference Information of Cooperation IT System | · Change to Refer Information from Cooperation IT System |
| ⋮ | ⋮ | ⋮ | ⋮ | ⋮ | ⋮ | ⋮ |

Fig. 8

Table 012 (Importance Setting of Determination Material Configuration Code and Determination Grounds Information)

| Process Setting (074) | Determination Material (041) | Determination Material Configuration Code (042) | Configuration Code Importance (081) | Determination Grounds Information (082) | Determination Grounds Information Importance (083) | Temporary Selection Flag (084) | Description of Setting Intent | Message (085) |
|---|---|---|---|---|---|---|---|---|
| jcset02 | Soldering Section | —/D | 80 | D | 80 | 0 | Preferentially Use Component Dedicated for DIP(D) in DIP Specification | |
| jcset02 | Soldering Section | —/D | 80 | RD | 40 | 0 | Use Component for Reflow/DIP (RD) in case of No Component Dedicated for DIP | |
| jcset02 | Soldering Section | —/D | 80 | H | 20 | 0 | Use Component for by-Hand(H) in case of Neither Component Dedicated for DIP (D) Nor Reflow/DIP (RD) | |
| jcset02 | Soldering Section | R/D | 80 | RD | 80 | 0 | Preferentially Use Component for Reflow/DIP (RD) in Reflow/DIP (RD) Specification | |
| jcset02 | Soldering Section | R/D | 80 | D | 40 | 0 | Use Component Dedicated for DIP(D) in case of No Component for Reflow/DIP (RD) *Lead Components are registered for DIP(D) and by-Hand (H). Description is on the Premise that No (H) Setting Against R/D in This Embodiment. | |
| jcset02 | Soldering Section | R/R | 80 | RR | 80 | 0 | Cannot be Used Component Except for Reflow | |
| jcset02 | Plate Making Section | PHT | 60 | P | 60 | 0 | Preferentially Use Component Dedicated for Photographic Process (P) in Photographic Process (PHT) Specification | |
| jcset02 | Plate Making Section | PHT | 60 | C | 40 | 0 | Use Component both for Photographic Process and Printing Process (C) in case of No Component for Printing Process(I) | |
| jcset02 | Plate Making Section | PHT | 60 | I | 20 | 1 | Temporarily Use Component Dedicated for Printing Process(I) in case of Neither Component Dedicated for Photographic Process (P) Nor both for Photographic Process and Printing Process (C), And Replace Component After Normal Registration<br>(Note) Out of Processing for the Information with Temporary Flag is Set When Normal Output or Checking | Temporary Select PCB CAD Component for Printing Process<br>Replace the Component to Component Dedicated for Photographic Process or Both for Photographic Process and Printing Process After Registering Any One of Them |
| jcset02 | Plate Making Section | PRT | 60 | I | 60 | 0 | Preferentially Use Component for Printing Process(I) in Printing Process (PRT) Specification | |
| jcset02 | Plate Making Section | PRT | 60 | C | 40 | 0 | Use Component both for Photographic Process and Printing Process (C) in case of No Component Dedicated for Printing Process(I) | |
| jcset02 | Mounting Density Section | MT-H | 40 | H | 40 | 0 | Use Component for High-Density Placement Specification (H) in case of High-Density Mounting Specification | |
| jcset02 | Mounting Density Section | MT-H | 40 | M | 20 | 0 | Use Component for Standard Density Placement Specification (M) in case of No Component for High-Density Placement Specification (H) | |
| jcset02 | Mounting Density Section | MT-M | 40 | M | 40 | 0 | Use Component for Standard Density Placement Specification (M) in case of Standard Mounting Density Specification | |
| jcset02 | Mounting Density Section | MT-M | 40 | L | 20 | 0 | Use Component for Low-Density Placement Specification (L) in case of No Component for Standard Density Placement Specification (M) | |
| jcset02 | Mounting Density Section | MT-L | 40 | L | 40 | 0 | Use Component for Low-Density Placement Specification (L) in case of Low-Density Mounting Specification | |
| jcset02 | Component Through Section | T | 100 | T | 100 | 0 | Use Component for Component Through Specification (T) and Mount by Process of Hand mounting and DIP Soldering in case of Component Through Specification | |
| jcset02 | Component Through Section | T | 100 | N | 20 | 0 | Use Component for Non-Through Specification (N) in case it is not Component Through Specification | |
| jcset02 | Component Through Section | N | 100 | N | 100 | 0 | Cannot be used Component Except for Non-Through Specification (N) in case of PCB for Non-Through Specification | |

Fig. 9

A List of Combinations of Determination Grounds Information

| Combination Number | Soldering Section (R/D) Determination Grounds Information (091) | Plate Making Section (PHT) Determination Grounds Information (092) | Mounting Density Section (MT-H) Determination Grounds Information (093) | Component Through Section (T) Determination Grounds Information (094) |
|---|---|---|---|---|
| 1 | RD | P | H | T |
| 2 | RD | P | H | N |
| 3 | RD | P | M | T |
| 4 | RD | P | M | N |
| 5 | RD | C | H | T |
| 6 | RD | C | H | N |
| 7 | RD | C | M | T |
| 8 | RD | C | M | N |
| 9 | RD | I | H | T |
| 10 | RD | I | H | N |
| 11 | RD | I | M | T |
| 12 | RD | I | M | N |
| 13 | D | P | H | T |
| 14 | D | P | H | N |
| 15 | D | P | M | T |
| 16 | D | P | M | N |
| 17 | D | C | H | T |
| 18 | D | C | H | N |
| 19 | D | C | M | T |
| 20 | D | C | M | N |
| 21 | D | I | H | T |
| 22 | D | I | H | N |
| 23 | D | I | M | T |
| 24 | D | I | M | N |

Fig. 10

A List of Combinations of Determination Grounds Information in Overall Importance Order

| 101 | 091 | | | 092 | | | 093 | | | 094 | | | 102 |
|---|---|---|---|---|---|---|---|---|---|---|---|---|---|
| Selection Priority Order | Soldering Section | | | Plate Making Section | | | Mounting Density Section | | | Component Through Section | | | ((Sum) of Overall Importance (Product)) |
| | Determination Material Configuration Code (R/D) | | Configuration Code Importance:80 | Determination Material Configuration Code (PHT) | | Configuration Code Importance:60 | Determination Material Configuration Code (MT-H) | | Configuration Code Importance:40 | Determination Material Configuration Code (T) | | Configuration Code Importance:100 | |
| | Determination Grounds Information | Determination Grounds Information Importance | Configuration Level Importance (Product) | Determination Grounds Information | Determination Grounds Information Importance | Configuration Level Importance (Product) | Determination Grounds Information | Determination Grounds Information Importance | Configuration Level Importance (Product) | Determination Grounds Information | Determination Grounds Information Importance | Configuration Level Importance (Product) | |
| 1 | RD | 80 | 6400 | P | 60 | 3600 | H | 40 | 1600 | T | 100 | 10000 | 21600 |
| 2 | RD | 80 | 6400 | P | 60 | 3600 | M | 20 | 800 | T | 100 | 10000 | 20800 |
| 3 | RD | 80 | 6400 | C | 40 | 2400 | H | 40 | 1600 | T | 100 | 10000 | 20400 |
| 4 | RD | 80 | 6400 | C | 40 | 2400 | M | 20 | 800 | T | 100 | 10000 | 19600 |
| 5 | RD | 80 | 6400 | I | 20 | 1200 | H | 40 | 1600 | T | 100 | 10000 | 19200 |
| 6 | RD | 80 | 6400 | I | 20 | 1200 | M | 20 | 800 | T | 100 | 10000 | 18400 |
| 7 | D | 40 | 3200 | P | 60 | 3600 | H | 40 | 1600 | T | 100 | 10000 | 18400 |
| 8 | D | 40 | 3200 | P | 60 | 3600 | M | 20 | 800 | T | 100 | 10000 | 17600 |
| 9 | D | 40 | 3200 | C | 40 | 2400 | H | 40 | 1600 | T | 100 | 10000 | 17200 |
| 10 | D | 40 | 3200 | C | 40 | 2400 | M | 20 | 800 | T | 100 | 10000 | 16400 |
| 11 | D | 40 | 3200 | I | 20 | 1200 | H | 40 | 1600 | T | 100 | 10000 | 16000 |
| 12 | D | 40 | 3200 | I | 20 | 1200 | M | 20 | 800 | T | 100 | 10000 | 15200 |
| 13 | RD | 80 | 6400 | P | 60 | 3600 | H | 40 | 1600 | N | 20 | 2000 | 13600 |
| 14 | RD | 80 | 6400 | P | 60 | 3600 | M | 20 | 800 | N | 20 | 2000 | 12800 |
| 15 | RD | 80 | 6400 | C | 40 | 2400 | H | 40 | 1600 | N | 20 | 2000 | 12400 |
| 16 | RD | 80 | 6400 | C | 40 | 2400 | M | 20 | 800 | N | 20 | 2000 | 11600 |
| 17 | RD | 80 | 6400 | I | 20 | 1200 | H | 40 | 1600 | N | 20 | 2000 | 11200 |
| 18 | RD | 80 | 6400 | I | 20 | 1200 | M | 20 | 800 | N | 20 | 2000 | 10400 |
| 19 | D | 40 | 3200 | P | 60 | 3600 | H | 40 | 1600 | N | 20 | 2000 | 10400 |
| 20 | D | 40 | 3200 | P | 60 | 3600 | M | 20 | 800 | N | 20 | 2000 | 9600 |
| 21 | D | 40 | 3200 | C | 40 | 2400 | H | 40 | 1600 | N | 20 | 2000 | 9200 |
| 22 | D | 40 | 3200 | C | 40 | 2400 | M | 20 | 800 | N | 20 | 2000 | 8400 |
| 23 | D | 40 | 3200 | I | 20 | 1200 | H | 40 | 1600 | N | 20 | 2000 | 8000 |
| 24 | D | 40 | 3200 | I | 20 | 1200 | M | 20 | 800 | N | 20 | 2000 | 7200 |

Fig. 11

Component Master with Codes that Aggregate Component Shapes 111, 112, 113, 114, 115

| Component Number | Packing Style | Maintenance Status | Machine Section | Size | Tape Width | Constant | Rating | Attributes | Target Code |
|---|---|---|---|---|---|---|---|---|---|
| R02-1111-05 | M | 5 | CM | 1005 | 8 | 1.0k | 1/10 | ... | SMS1005 |
| R02-3333-05 | M | 5 | CM | 1005 | 8 | 1.6k | 1/10 | ... | SMS1005 |
| R02-5555-05 | M | 4 | CM | 1005 | 8 | 2.7k | 1/10 | ... | SMS1005 |
| R02-7777-05 | B | 5 | H | 90-20 | - | 100k | 1 | ... | LHA9020 |
| R02-9999-05 | M | 5 | AX | 90-20 | 52 | 68k | 1 | ... | LMA9020 |
| ⋮ | ⋮ | ⋮ | ⋮ | ⋮ | ⋮ | ⋮ | ⋮ | ⋮ | ⋮ |

Description of Maintenance Status

| Maintenance Status | Contents |
|---|---|
| 0 | Unregistered |
| 1 | Under Registration |
| 2 | Correction Required (for Changes in Design Standards, Operation, etc.) |
| 3 | Under Correction(for Dealing with Troubles, Changes in Specification or Technical Standards, etc.) |
| 4 | Temporarily Registered(for Testing, Early File Generation, Early Placement Confirmation, etc.) |
| 5 | Registration Completed |

Fig. 12

Table 011 (Association between Combinations of Determination Grounds Information and Determination Result Information)
-- Displayed Only SMS1005 of Surface Mount Component --

| 115 | 091 | 092 | 093 | 094 | 121 | | 122 | 123 | 124 | 125 |
|---|---|---|---|---|---|---|---|---|---|---|
| Target Code | Soldering Section | Plate Making Section | Mounting Density Section | Component Through Section | Process Section | Maintenance Status | Item Requiring Correction | PCB CAD Component Number (Determination Result Information) | Message |
| | Determination Grounds Information (R/D) | Determination Grounds Information (PHT) | Determination Grounds Information (MT-H) | Determination Grounds Information (T) | | | | | |
| SMS1005 | RD | I | M | N | 1 | 4 | 0000001--- | 1000 | · Check Function Could Not be Set Because of Not Enough Data Necessary for Mounting Area Check. Update PCB CAD Components in File and Confirm that Mounting Area Check Can be Used after Maintenance of PCB CAD Components is Completed. |
| SMS1005 | RR | P | H | N | 1 | 4 | 0100010--- | 2000 | Netlist Can be Captured, but Since Land Specification is not Unfixed, Perform Replacement Process After Completion of Maintenance of PCB CAD Component |
| SMS1005 | RD | I | L | N | 0 | 3 | 1101000--- | 3000 | · Under Correction with Dealing a Trouble |
| SMS1005 | RD | P | H | N | 1 | 5 | 0000000--- | 4000 | |
| SMS1005 | RD | C | M | N | 1 | 5 | 0000000--- | 5000 | |
| ⋮ | ⋮ | ⋮ | ⋮ | ⋮ | ⋮ | ⋮ | ⋮ | ⋮ | ⋮ |

Description of Process Section and Maintenance Status

| Process Section | Contents |
|---|---|
| 0 | Out of Processing |
| 1 | To be Processed |

| Maintenance Status | Contents |
|---|---|
| 0 | Unregistered |
| 1 | Under Registration |
| 2 | Correction Required (for Changes in Design Standards, Operation, etc.) |
| 3 | Under Correction(for Dealing with Troubles, Changes in Specification or Technical Standards, etc.) |
| 4 | Temporarily Registered(for Testing, Early File Generation, Early Placement Confirmation, etc.) |
| 5 | Registration Completed |

Fig. 13

PCB CAD Component Number output for SMS1005

| 115 | 101 | 091 | 092 | 093 | 094 | 121 | 122 | 123 | 124 | 125 |
|---|---|---|---|---|---|---|---|---|---|---|
| Target Code | Selection Priority Order | Soldering Section | Plate Making Section | Mounting Density Section | Component Through Section | Process Section | Maintenance Status | Item Requiring Correction | PCB CAD Component Number | Message |
| | | Determination Grounds Information (R/D) | Determination Grounds Information (PHT) | Determination Grounds Information (MT-H) | Determination Grounds Information (T) | | | | | |
| SMS1005 | 13 | RD | P | H | N | 1 | 5 | 0000000... | 4000 | |
| SMS1005 | 16 | RD | C | M | N | 1 | 5 | 0000000... | 5000 | |
| SMS1005 | 18 | RD | I | M | N | 1 | 4 | 0000001... | 1000 | · Check Function Could Not be Set Because of Not Enough Data Necessary for Mounting Area Check. Update PCB CAD Components in File and Confirm that Mounting Area Check Can be Used after Maintenance of PCB CAD Components is Completed |
| SMS1005 | --- | RD | I | L | N | 0 | 3 | 1101000... | 3000 | · Under Correction with Dealing a Trouble |
| SMS1005 | --- | RR | P | H | N | 1 | 4 | 0100010... | 2000 | · Netlist Can be Captured, but Since Land Specification is not Unfixed, Perform Replacement Process After Completion of Maintenance of PCB CAD Component |

Description of Process Section and Maintenance Status

| Process Section | Contents |
|---|---|
| 0 | Out of Processing |
| 1 | To be Processed |

| Maintenance Status | Contents |
|---|---|
| 0 | Unregistered |
| 1 | Under Registration |
| 2 | Correction Required (for Changes in Design Standards, Operation, etc.) |
| 3 | Under Correction(for Dealing with Troubles, Changes in Specification or Technical Standards, etc.) |
| 4 | Temporarily Registered(for Testing, Early File Generation, Early Placement Confirmation, etc.) |
| 5 | Registration Completed |

Fig. 14

Table 011 (Association between Combinations of Determination Grounds Information and Determination Result information)

- - Displayed Only Lead Components - -

| 115 | 091 | 092 | 093 | 094 | 121 | | 122 | 123 | 124 | 125 |
|---|---|---|---|---|---|---|---|---|---|---|
| Target Code | Soldering Section | Plate Making Section | Mounting Density Section | Component Through Section | Process Section | Maintenance Status | Item Requiring Correction | PCB CAD Component Number (Determination Result Information) | Message |
| | Determination Grounds Information (R/D) | Determination Grounds Information (PHT) | Determination Grounds Information (MT-H) | Determination Grounds Information (T) | | | | | |
| LHA9020 | D | P | M | T | 1 | 4 | 0011010... | 2000 | · Netlist Can be Captured, but Since Land Specification is not Unfixed, Perform Replacement Process After Completion of Maintenance of PCB CAD Component |
| LHA9020 | H | I | L | N | 1 | 5 | 0000000... | 6000 | |
| LHA9020 | D | C | M | T | 1 | 4 | 1010000... | 4000 | ·Check Mounting Results in a Prototype Check Meeting of PCB CAD Components responding to New Design Standards Hole Size and Report the Result to Library Staff. |
| LMA9020 | D | I | L | N | 1 | 5 | 0000000... | 1000 | |
| LMA9020 | D | P | H | N | 1 | 5 | 0100000... | 3000 | |
| LMA9020 | D | I | M | N | 1 | 5 | 0000000... | 5000 | |
| ⋮ | ⋮ | ⋮ | ⋮ | ⋮ | ⋮ | ⋮ | ⋮ | ⋮ | ⋮ |

Description of Process Section and Maintenance Status

| Process Section | Contents |
|---|---|
| 0 | Out of Processing |
| 1 | To be Processed |

| Maintenance Status | Contents |
|---|---|
| 0 | Unregistered |
| 1 | Under Registration |
| 2 | Correction Required (for Changes in Design Standards, Operation, etc.) |
| 3 | Under Correction(for Dealing with Troubles, Changes in Specification or Technical Standards, etc.) |
| 4 | Temporarily Registered(for Testing, Early File Generation, Early Placement Confirmation, etc.) |
| 5 | Registration Completed |

Fig. 15

PCB CAD Component Number Output for LMA9020 and LHA9020

| 115 | 101 | 091 | 092 | 093 | 094 | 121 | 122 | 123 | 124 | 125 |
|---|---|---|---|---|---|---|---|---|---|---|
| Target Code | Selection Priority Order | Soldering Section | Plate Making Section | Mounting Density Section | Component Through Section | Process Section | Maintenance Status | Item Requiring Correction | PCB CAD Component Number | Message |
| | | Determination Grounds Information (R/D) | Determination Grounds Information (PHT) | Determination Grounds Information (MT-H) | Determination Grounds Information (T) | | | | | |
| LHA9020 | 8 | D | P | M | T | 1 | 4 | 0011010... | 2000 | · Netlist Can be Captured, but Since Land Specification is not Unfixed, Perform Replacement Process After Completion of Maintenance of PCB CAD Component |
| LHA9020 | 10 | D | C | M | T | 1 | 4 | 1010000... | 4000 | · PCB CAD Component Responding to New Standards Hole Size. Check Mounting Status in Prototype and Report the Result to Library Staff. |
| LHA9020 | — | H | I | L | N | 1 | 5 | 0000000... | 6000 | |
| LMA9020 | 19 | D | P | H | N | 1 | 5 | 0100000... | 3000 | |
| LMA9020 | 24 | D | I | M | N | 1 | 5 | 0000000... | 5000 | |
| LMA9020 | — | D | I | L | N | 1 | 5 | 0000000... | 1000 | |

Description of Process Section and Maintenance Status

| Process Section | Contents |
|---|---|
| 0 | Out of Processing |
| 1 | To be Processed |

| Maintenance Status | Contents |
|---|---|
| 0 | Unregistered |
| 1 | Under Registration |
| 2 | Correction Required (for Changes in Design Standards, Operation, etc.) |
| 3 | Under Correction(for Dealing with Troubles, Changes in Specification or Technical Standards, etc.) |
| 4 | Temporarily Registered(for Testing, Early File Generation, Early Placement Confirmation, etc.) |
| 5 | Registration Completed |

Fig. 16

A Setting Change Version of Determination Grounds Information Importance of Fig. 8

| 074 Process Setting | 041 Determination Material | 042 Determination Material Configuration Code | 081 Configuration Code Importance | 082 Determination Grounds Information | 083 Determination Grounds Information Importance | 084 Temporary Selection Flag | Description of Setting Intent | 085 Message |
|---|---|---|---|---|---|---|---|---|
| jcset02 | Soldering Section | -/D | 80 | D | 80 | 0 | Preferentially Use Component Dedicated for DIP(D) in DIP Specification | |
| jcset02 | Soldering Section | -/D | 80 | RD | 40 | 0 | Use Component for Reflow/DIP (RD) in case of No Component Dedicated for DIP | |
| jcset02 | Soldering Section | -/D | 80 | H | 20 | 0 | Use Component for by-Hand (H) in case of Neither Component Dedicated for DIP (D) Nor Reflow/DIP (RD) | |
| jcset02 | Soldering Section | R/D | 80 | RD | 80 | 0 | Preferentially Use Component for Reflow/DIP (RD) in Reflow/DIP (RD) Specification | |
| jcset02 | Soldering Section | R/D | 80 | D | 70 | 0 | Use Component Dedicated for DIP(D) in case of No Component Dedicated for Reflow/DIP (RD) *Lead Components are registered for DIP(D) and by-Hand (H). Description is on the Premise that No by-Hand (H) Component Against Reflow/DIP (RD) Specification in This Embodiment. | |
| jcset02 | Soldering Section | R/R | 80 | RR | 80 | 0 | Cannot be Used Component Except for Reflow (R) | |
| jcset02 | Plate Making Section | PHT | 60 | P | 60 | 0 | Preferentially Use Component for Photographic Process (P) for Plate Making Section (PHT) | |
| jcset02 | Plate Making Section | PHT | 60 | C | 40 | 0 | Use Component Both for Photographic Process and Printing Process(C) in case of No Component for Photographic Process (P) | |
| jcset02 | Plate Making Section | PHT | 60 | I | 20 | 1 | Use Component Dedicated for Printing Process(I) in case of Neither Component Dedicated for Photographic Process (P) Nor both for photolithography and printing method (C) (Note) Out of Processing for the Information with Temporary Flag is Set When Normal Output or Checking | Temporary Select PCB CAD Component for Printing Process Replace the Component to Component Dedicated for Photographic Process or Both for Photographic Process and Printing Process After Registering Any One of Them |
| jcset02 | Plate Making Section | PRT | 60 | I | 60 | 0 | Preferentially Use Component for Printing Process(I) for Printing Process (PRT) Specification | |
| jcset02 | Plate Making Section | PRT | 60 | C | 40 | 0 | Use Component both for Photographic Process and Printing Process (C) in case of No Component for Printing Process(I) | |
| jcset02 | Mounting Density Section | MT-H | 40 | H | 80 | 0 | Use Component for High-Density Placement Specification (H) in case of High-Density Mounting Specification | |
| jcset02 | Mounting Density Section | MT-H | 40 | M | 10 | 0 | Use Component for Standard Density Placement Specification (M) in case of No Component for High-Density Placement Specification | |
| jcset02 | Mounting Density Section | MT-M | 40 | M | 80 | 0 | Use Component for Standard Density Placement Specification (M) in case of Standard Mounting Density Specification | |
| jcset02 | Mounting Density Section | MT-M | 40 | L | 10 | 0 | Use Component for Low Density Placement Specification (L) in case of No Component for Standard Density Placement Specification | |
| jcset02 | Mounting Density Section | MT-L | 40 | L | 80 | 0 | Use Component for Low Density Placement Specification (L) in case of Low Density Mounting Specification | |
| jcset02 | Component Through Section | T | 100 | T | 100 | 0 | Use Component for Component Through Specification (T) and Mount by Process of Hand mounting and DIP Soldering in case of Component Through Specification | |
| jcset02 | Component Through Section | T | 100 | N | 20 | 0 | Use Component for Non-Through Specification (N) in case of No Component for Component Through Specification | |
| jcset02 | Component Through Section | N | 100 | N | 100 | 0 | Cannot be used Component Except for Non-Through Specification (N) in case of PCB without Through Holes | |

Fig. 17 Comparison of Differences between Combinations of Determination Grounds Information Before and After Setting Change 101 091 092 093 094 102

| Selection Priority Order | Soldering Section | | | | Plate Making Section | | | Mounting Density Section | | | | Component Through Section | | | (Sum) of Overall Importance (Product) |
|---|---|---|---|---|---|---|---|---|---|---|---|---|---|---|---|
| | Determination Material Configuration Code (R/D) | | | Configuration Code Importance:80 | Determination Material Configuration Code (PHT) | | Configuration Code Importance:60 | Determination Material Configuration Code (MT-H) | | | Configuration Code Importance:40 | Determination Material Configuration Code (T) | | Configuration Code Importance:100 | |
| | Determination Grounds Information | | Determination Grounds Information Importance | Configuration Level Importance (Product) | Determination Grounds Information | Determination Grounds Information Importance | Configuration Level Importance (Product) | Determination Grounds Information | | Determination Grounds Information Importance | Configuration Level Importance (Product) | Determination Grounds Information | Determination Grounds Information Importance | Configuration Level Importance (Product) | |
| 1 | RD | RD | 80 | 6400 | P | 60 | 3600 | H | H | 80 | 3200 | T | 100 | 10000 | 23200 |
| (2) | RD | D | 70 | 5600 | P | 60 | 3600 | M | H | 80 | 3200 | T | 100 | 10000 | 22400 |
| 3 | RD | RD | 80 | 6400 | C | 40 | 2400 | H | H | 80 | 3200 | T | 100 | 10000 | 22000 |
| 4 | RD | D | 70 | 5600 | C | 40 | 2400 | M | H | 80 | 3200 | T | 100 | 10000 | 21200 |
| 5 | RD | RD | 80 | 6400 | I | 20 | 1200 | H | H | 80 | 3200 | T | 100 | 10000 | 20800 |
| (6) | RD | RD | 80 | 6400 | P | 60 | 3600 | M | M | 10 | 400 | T | 100 | 10000 | 20400 |
| 7 | D | D | 70 | 5600 | I | 20 | 1200 | H | H | 80 | 3200 | T | 100 | 10000 | 20000 |
| 8 | D | D | 70 | 5600 | P | 60 | 3600 | M | M | 10 | 400 | T | 100 | 10000 | 19600 |
| 9 | D | RD | 80 | 6400 | C | 40 | 2400 | H | M | 10 | 400 | T | 100 | 10000 | 19200 |
| 10 | D | D | 70 | 5600 | C | 40 | 2400 | M | M | 10 | 400 | T | 100 | 10000 | 18400 |
| 11 | D | RD | 80 | 6400 | I | 20 | 1200 | H | M | 10 | 400 | T | 100 | 10000 | 18000 |
| 12 | D | D | 70 | 5600 | I | 20 | 1200 | M | M | 10 | 400 | T | 100 | 10000 | 17200 |
| 13 | RD | RD | 80 | 6400 | P | 60 | 3600 | H | H | 80 | 3200 | N | 20 | 2000 | 15200 |
| 14 | RD | D | 70 | 5600 | P | 60 | 3600 | M | H | 80 | 3200 | N | 20 | 2000 | 14400 |
| 15 | RD | D | 80 | 6400 | C | 40 | 2400 | H | H | 80 | 3200 | N | 20 | 2000 | 14000 |
| 16 | RD | RD | 70 | 5600 | C | 40 | 2400 | M | H | 80 | 3200 | N | 20 | 2000 | 13200 |
| 17 | RD | RD | 80 | 6400 | I | 20 | 1200 | H | H | 80 | 3200 | N | 20 | 2000 | 12800 |
| 18 | RD | RD | 80 | 6400 | P | 60 | 3600 | M | M | 10 | 400 | N | 20 | 2000 | 12400 |
| 19 | D | D | 70 | 5600 | I | 20 | 1200 | H | H | 80 | 3200 | N | 20 | 2000 | 12000 |
| 20 | D | D | 70 | 5600 | P | 60 | 3600 | M | M | 10 | 400 | N | 20 | 2000 | 11600 |
| 21 | D | RD | 80 | 6400 | C | 40 | 2400 | H | M | 10 | 400 | N | 20 | 2000 | 11200 |
| 22 | D | D | 70 | 5600 | C | 40 | 2400 | M | M | 10 | 400 | N | 20 | 2000 | 10400 |
| 23 | D | RD | 80 | 6400 | I | 20 | 1200 | H | M | 10 | 400 | N | 20 | 2000 | 10000 |
| 24 | D | D | 70 | 5600 | I | 20 | 1200 | M | M | 10 | 400 | N | 20 | 2000 | 9200 |

INFORMATION PROCESSING FOR OUTPUTTING COMPREHENSIVE DETERMINATION RESULT ON THE BASIS OF A PLURALITY OF DETERMINATION MATERIALS

TECHNICAL FIELD

The present invention relates to a method for information processing enabling computerization of a work requiring "determination result" in which all requests related to a plurality of determination materials are reflected.

BACKGROUND ART

The "determination" result in which all of requests related to a plurality of determination materials are reflected must be a result obtained by making a "comprehensive determination" with regard to requests for each determination material and requests for the whole. If these requests are processed using a control structure including conditional branch and iterative processing of an existing programming language, and the branch conditions are not satisfied as a result, the requests will not be reflected in the determination result at all.

However, the requests have an influence on the determination result even when not satisfying the branch conditions as long as the requests are treated as the determination material, and therefore, such requests need to be properly reflected in the determination result. To derive the result of the "comprehensive determination" in which all the requests related to a plurality of determination materials are reflected, a new information processing method is needed in which each request of each determination material has its own importance, and furthermore, that "determines comprehensively" the requests between determination materials and their importance and the influence on each other.

SUMMARY OF INVENTION

Technical Problem

Although computerization of a work in which process procedure is determined has progressed by a program using conditional branch and iterative processing, a work requiring a "determination" in which all of requests relating to a plurality of determination materials are reflected must rely on human determination, and the computerization has not progressed at all. The purpose of the present invention is to provide an information processing method that enables computerization of a work requiring a comprehensive "determination" in which all requests related to a plurality of determination materials are reflected, the determination having relied on a person regardless of industry type.

Solution to Problem

A mechanism for computerizing a "determination" (hereinafter, referred to as a "determination processing") that reflects all of requests related to a plurality of determination materials is described with reference to FIG. 1.

Table 011 shows an example of a table that associates determination result Information with its attributes, in which combinations of attributes (hereinafter, referred to as "determination grounds information") that serve as grounds for determination are registered for four determination materials.

For example, when the determination result Information in this table is not shown with Yes or No, but components to be used for a product, even for the components having the same performance, the components to be selected are different between a product used in a high temperature environment and a product to be sold cheaply, and furthermore, when the product is manufactured at different sites, determination must be based on a track record of stable component procurement and the mountability related to the production facilities.

In the process from determination to selection of the best components under such conditions, the temperature characteristics, price, procurability, mountability, and the like are included as determination materials, and the attribute values (temperature characteristic values, actual purchasing prices, and the like) of the components that are determination grounds corresponding to each determination material request are registered as determination grounds information.

The determination grounds information associated with the determination result information to be registered in table 011 is set for each content of work processing to which determination is to be made, and even when the result of a determination processing is shown with "Yes" or "No", as long as a work is what the result can be determined and processed by human, there are always materials for determination and information that is ground for determination in the work, and converting these information into data enables computerization of the comprehensive determination work having a plurality of determination materials.

In order to output the comprehensive determination result based on a plurality of determination materials by using table 011, it is necessary to first generate all combinations of determination grounds information that has been set, and then set the importance for overall combinations of determination grounds information based on the determination grounds information and its importance set in the determination materials, and differences in importance among the determination materials. Then, the combinations of determination grounds information are sorted in overall importance order, and the determination results are referenced by searching table 011 based on the sorted combinations of determination grounds information. A specific process procedure for outputting the determination results using a series of information is described below.

Table 012 shows the source information for generating combinations of determination grounds information is set, in which information of determination materials (1) to (4) is set. The importance of the determination material and the differences in importance among the determination materials are set for each determination material as determination material configuration code importance. The importance of the determination grounds information is set for each set determination grounds information. table 012 in FIG. 1 shows an example in which two settings of determination grounds information are set for each determination material, and therefore the number of combinations is 2×2×2×2=16, and an image in the lower part of process 013 shows the combinations of these determination grounds information generated by process 013.

Next, a processing of sorting combinations of determination grounds information in process 013 is described below. This processing is to calculate the importance of the overall combination of the determination grounds information and sort it by using the importance information set in the determination grounds information and the importance information of the determination material configuration code.

For example, when one of determination grounds information set in determination material (1) in FIG. 1 has an importance value "100" and one of determination grounds information of determination material (2) has an importance value "30", these settings merely show numerical values representing the importance in each determination material, and does not correctly reflect the overall importance of four determination materials. If the determination material configuration code importance of determination material (1) is set low (a situation where determination material (1) is not considered important) and the determination material configuration code importance of determination material (2) is set high (a situation where determination material (2) is considered important), the importance value "30" of the determination grounds information set in determination material (2) may have to be treated as having a higher degree of importance as a comprehensive determination result based on the four determination materials.

In order to make this situation correctly determine in the processing, calculation 016 is executed between the importance of the determination grounds information set for each determination material and the determination material configuration code importance, and Importance (1/A) to Importance (4/A) for each determination material are calculated. As long as an appropriate conversion is possible, any calculation or combination of calculations can be used. In the embodiment described later, "multiplication" of the determination grounds information importance and the determination material configuration code importance is used.

Furthermore, in order to calculate the "overall importance as a combination" of the determination grounds information, calculation 017 is executed on Importance (1/A) to Importance (4/A) which are the results of calculation 016, and the result is defined as Importance (A), and the combinations of determination grounds information are sorted in descending order of the numerical values. As for calculation 017, as long as an appropriate conversion is possible, any calculation or combination of calculations can be used. In the embodiment described later, "addition" of the results of calculation 016 is used, and an image in the upper part of process 013 in FIG. 1 shows the result of sorting by this calculation result.

Based on the combinations of determination grounds information sorted in descending order of importance, a process 014 is executed to search for a combination of determination grounds information for each determination material in the table 011, and the record information determined as request specifications, the information used for a series of processing, and the like are output as result 015, and then the determination processing is completed.

Advantageous Effects of Invention

The present invention has an object to achieve computerization of a work that require a comprehensive determination based on a plurality of determination materials and their requests, which have been dependent on human determination, and enables computerization regardless of industry types or contents of work that involves determination. The absence of human determination leads to prevention of human error determination and can prevent use of the inconsistent determination result due to changes the person making the determination, and furthermore, the determination knowhow can be accumulated as the table setting such as determination material, determination grounds information, and their importance, thereby making it possible to continuously improve the accuracy of the determination processing.

When a "determined determination result" involves many departments, the correction direction may not be easily determined due to requests for corrections come in pieces from those departments separately. In the case of a work where the process proceeds based on the determined determination results, the risk of "reworking" occurring increases each time due to a request for correction that comes in as the process proceed. Even in such work, by setting the requests of related departments such as knowledge, techniques, operation, experience, experience, knowhow, and the like in each table related to the determination processing, the optimal determination result information is available to the requests from all related departments from the beginning, thereby making it possible to greatly reduce the occurrence of corrections and reworking for the determined determination results.

BRIEF DESCRIPTION OF DRAWINGS

FIG. 4 shows a work environment and determination materials for PCB to be designed in an embodiment.

FIG. 5 shows table 031 (association between operation management unit and operation generation).

FIG. 6 shows table 032 (association between operation generation and function setting).

FIG. 7 shows table 033 (association between function setting and process).

FIG. 8 shows table 012 (importance setting of determination material configuration code and determination grounds information).

FIG. 9 shows a list of combinations of determination grounds information.

FIG. 10 shows a list of combinations of determination grounds information in overall importance order.

FIG. 11 shows component master with codes that aggregate component shapes.

FIG. 12 shows table 011 (association between combinations of determination grounds information and determination result information).

FIG. 13 shows PCB CAD component number output for SMS1005.

FIG. 14 shows table 011 (association between combinations of determination grounds information and determination result information).

FIG. 15 shows PCB CAD component number output for LMA9020 and LHA9020.

FIG. 16 shows a setting change version of determination grounds information importance of FIG. 8.

FIG. 17 shows comparison of differences between combinations of determination grounds information before and after setting change.

DESCRIPTION OF EMBODIMENT

Figure 1:
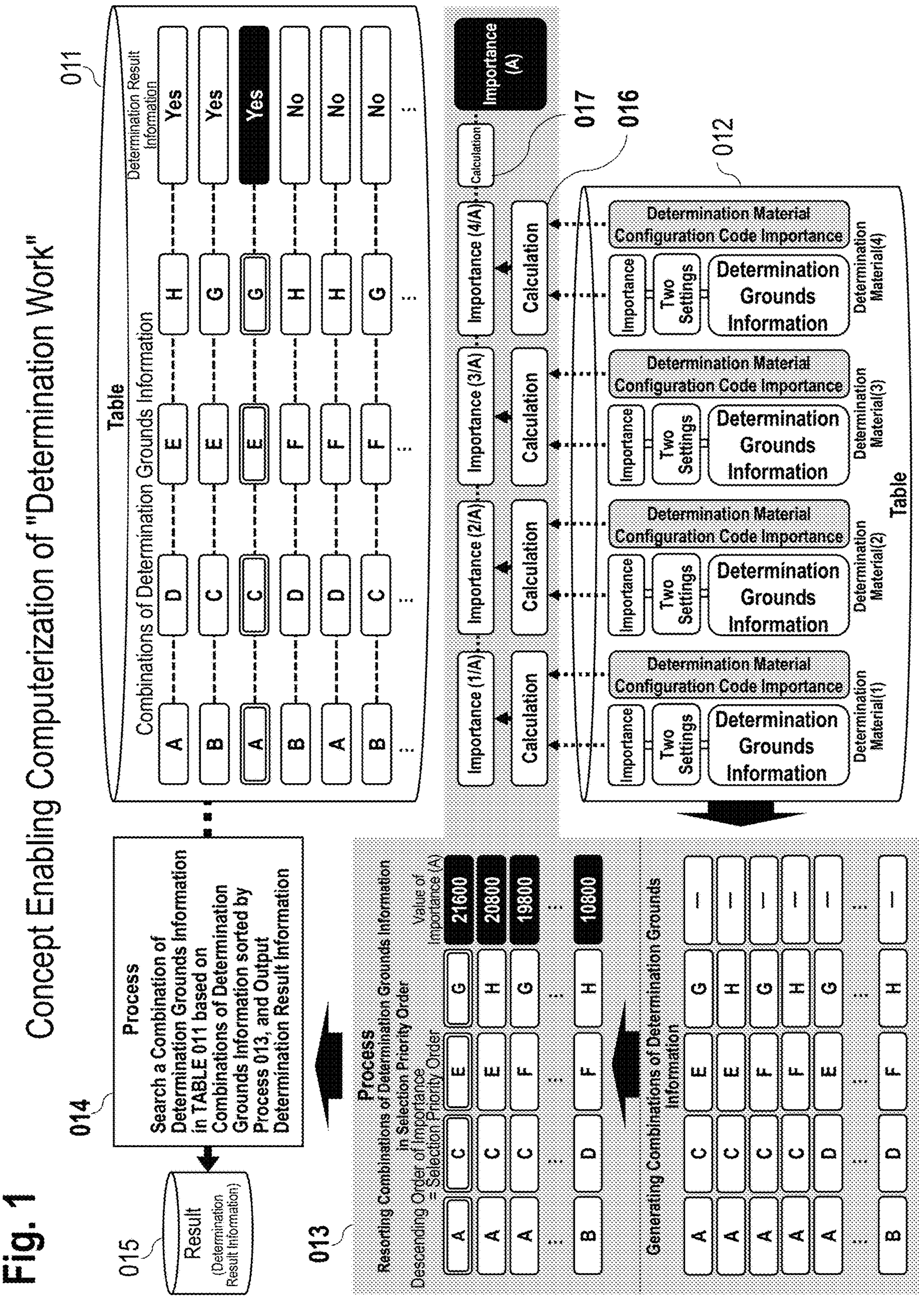
FIG. 1 shows a concept enabling computerization of "determination work".

A specific processing is described below with reference to the drawings for an embodiment of information processing that determines and selects information to be used based on the importance of determination materials and request settings for each determination material. Note that the present invention is not limited by the present embodiment.

As an embodiment, a processing of selecting optimal "PCB CAD (Computer-Aided Design) component number" based on a plurality of determination materials such as product specifications, PCB (Printed Circuit Board) specifications, and production facility specifications is described below.

An "overview" of PCB design work is described below before the description of determination processing in an embodiment, because knowledge including regulations, standards, tool functions, PCB specifications, production facilities, and operational rules relating to PCB design work is necessary to understand the description of determination processing of selecting PCB CAD component numbers (hereinafter, referred to as "PCB CAD component number selection").

First, PCB CAD components is described below. PCB CAD components are data related to electronic components or the like to be placed on a PCB on a computer-based PCB design tool (hereinafter, referred to as "PCB CAD"), so that information including data for being displayed on a screen, data for using various check functions of PCB CAD, data for creating PCB artwork necessary for PCB manufacturing, and data of origin position and registered angle for mounting the component on PCB can be handled as one "component" for PCB CAD design, which is referred to as "PCB CAD component", and is managed by individually assigning a number (hereinafter, referred to as "PCB CAD component number").

The design of PCB CAD components are registered in component database of PCB CAD (hereinafter, referred to as "library") with design specifications that can meet the highest possible level (hereinafter, referred to as "optimal design specifications") based on many requests and restrictions (hereinafter, referred to as "PCB mounting conditions") related to mounting, including the material and size of PCB, PCB manufacturing process, mounting machine capacity used for production and its restriction, soldering method, restriction of the soldering equipment, PCB design standards in which mounting technology and manufacturing technology are reflected, operational rules, and technical ability of PCB manufacturer.

PCB design involves capturing registered PCB CAD components in a PCB CAD file, inputting PCB outline data, then placing components, and producing a circuit called pattern that allows electricity to flow through copper foil. Information for connecting terminals of components is called a "netlist", and is created by schematic CAD. Executing a processing of capturing netlist simultaneously with capturing of PCB CAD components makes it possible to place the PCB CAD components and construct a pattern based on the connection information between terminals.

Capturing netlist is an essential function for improving the efficiency of PCB design and preventing incorrect pattern connections, and PCB CAD components corresponding to symbols representing components on schematic CAD and data related to pin swap of components must be registered to execute this function. In order to start PCB design as planned, all necessary PCB CAD components must be registered by scheduled start date of PCB design. However, capturing netlist can be processed using PCB CAD components for which only minimal information necessary for capturing is registered, and a method of early starting PCB design using incomplete PCB CAD components will be described separately. Processing of information related to pin swap of components does not directly relate to determination processing, therefore the description is omitted.

Next, the reason why "registration of PCB CAD components with optimal design specifications" is necessary is described. PCB needs copper foil portions called "lands" for soldering components, and the accuracy of land formation differs depending on PCB manufacturing process where lands are marked. In order to solder with high quality, respective specifications must be selected to be suitable for desired request levels, including the PCB manufacturing process where lands are formed, design specifications for component lands, and regulations related to distance between lands of components.

In order to mount components with high density (hereinafter, referred to as "high-density mounting"), it is necessary to use PCB material with a small PCB size and linear expansion coefficient, facilities at a planned production site must be capable of supporting high-density mounting, and further component mounting standards must be selected to satisfy these requests.

Further, in order to prevent component placement errors during PCB design, it is effective to use a "mounting area check function" of PCB CAD aiding components placement that meets PCB design standards. In order to reduce mounting failure by using this function, it is essential to set mounting area check function consistent with selection of PCB CAD components having mounting check area data that meets PCB design standards.

Components in view of mounting methods are broadly classified into surface mount components being soldered on a PCB surface and lead components being inserted into holes drilled on a PCB and then soldered. The shape and size of holes may differ depending on PCB material and method of drilling holes on PCB even fot the same lead components, and further in the case of PCB on which holes for components called through holes are to be processed to copper plating process, hole sizes are reduced by plating thickness, and therefore, it is necessary to select a PCB CAD component having a suitable hole size for each hole processing conditions. PCB CAD component having an unsuitable hole size is selected leads to troubles such as unable or difficult inserting the component into the hole, or soldering defect occurring due to the hole being too large, it is also necessary to optimize PCB CAD component number selection for combinations of hole processing conditions.

In order to complete registration and correctly select PCB CAD components that meet these conditions without delaying the timing of starting PCB design, it is important to aggregate and "reduce the number of registrations" within the range that meets the requests such as mounting quality and reliability, and it is also necessary to establish a system that can meet the maintenance requests of PCB CAD components.

The number of registered PCB CAD components can be reduced by adopting "common specifications" that can accommodate different PCB mounting conditions, and can also be reduced by expanding the aggregation unit of design specifications. However, these measures lead to a decline in mounting density and mounting quality, and it is important to set specifications the level at which it can be competitive by judging relative competitiveness of other companies.

Figure 2:
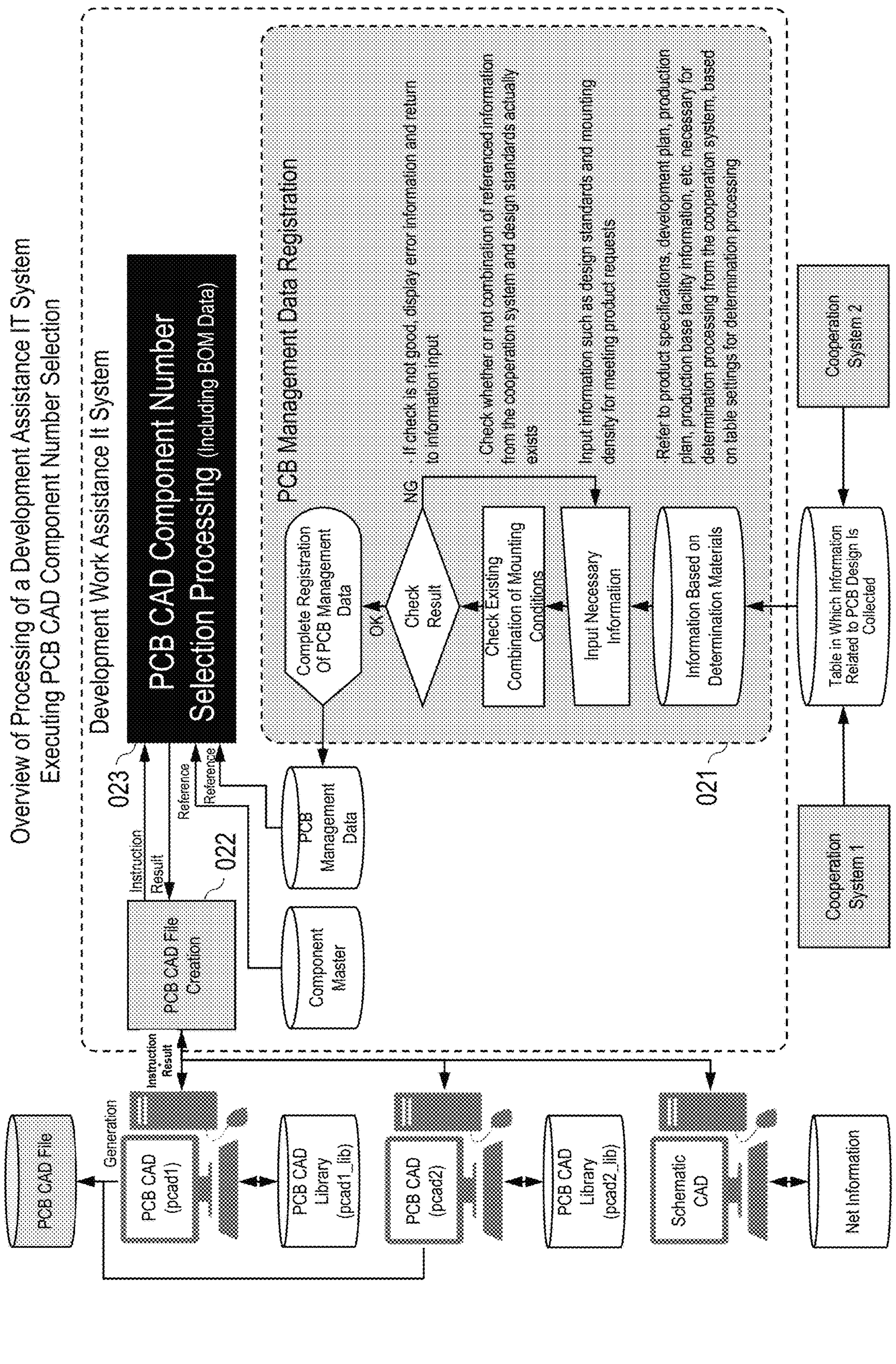
FIG. 2 shows an overview of processing of a development assistance IT system executing PCB CAD component number selection.

An "overview" of IT system aiding development work shown in FIG. 2 and a series of processing including PCB CAD cooperation is described before describing specific processing of PCB CAD component number selection using determination processing.

IT system that aids PCB design has a variety of configurations.

FIG. 2 shows an example of a system configuration for generating a PCB CAD file with netlist based on processing result, where an IT system aiding development work is equipped with a series of functions that aids PCB design work, and one of which is PCB CAD component number selection processing 023.

In order to execute PCB CAD component number selection processing 023, requests for PCB necessary for realizing product concept and production line information of planned PCB production site, and the like are required, and it is also necessary, in addition to referring to information from the IT system that manages the product planning, design, specifications, development plan, production plan, and facility information, to set the information that serve as determination materials for PCB CAD component number selection, such as selecting design standards rank related to PCB manufacturing process, mounting density and wiring specifications based on these information, and processing of registering this series of information is "PCB management data registration 021". "A series of information associated with PCB" can be registered as the PCB management data only when it can be confirmed that the setting of referenced and input mounting conditions is actually manufacturable and that consistency of the conditions is ensured.

Provided that by establishing a mechanism that PCB CAD system registers "information available for the process" in the PCB CAD file from among the registered PCB management data, or it refers the PCB management data, PCB CAD system can use the information for outputting check drawing, outputting Gerber data for PCB manufacturing, various check functions, automation of processing to be executed when editing files, and the like. Note that when storing the data in a file, a function is required to ensure the consistency of the information against changes in the management data.

The execution environment for creating a PCB CAD file with netlist is ready when registration of PCB management data, registration of component master information of the components registered in the BOM (Bill Of Materials), completion of schematic file by schematic CAD, and registration/maintenance of the PCB CAD components used in PCB CAD library (pcad1_lib) of the selected PCB CAD system (e.g., when pcad1 is selected) are completed.

PCB CAD file creation 022 is executed by designating schematic CAD file, BOM, PCB CAD system to be used, and the name of PCB CAD file to be created, so that PCB CAD component number selection processing 023 is executed and the netlist is extracted from the schematic file, and instruction to create a PCB CAD file is issued to the selected PCB CAD system based on the respective results, whereby the PCB CAD file with the netlist is created. The selection of PCB CAD library to be used by the selected PCB CAD system will be described in the description of FIG. 7.

Figure 3:
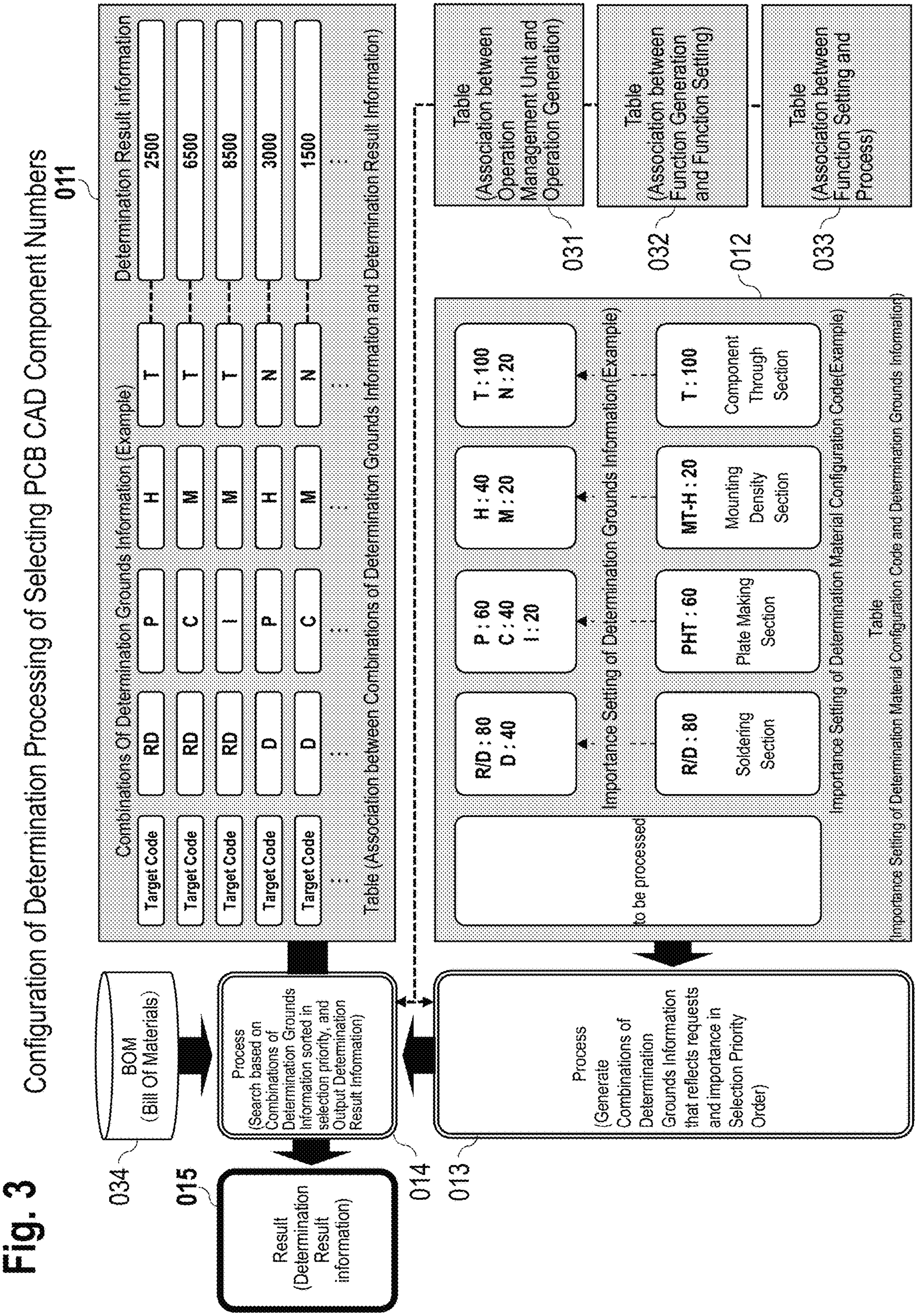
FIG. 3 shows a configuration of determination processing of selecting PCB CAD component numbers.

FIG. 3 shows an overall configuration diagram of the determination processing for selecting the PCB CAD component numbers, and specific table setting and processing flow is individually described using FIGS. 4 to 17.

FIG. 4 shows work environment of a PCB designer. It is assumed that division code to which the designer belongs is "wd", department code is "e_des1", and function code for PCB CAD component number selection is "macsel", and latest settings are used for processing. Two types of PCB CAD systems are available, and in this embodiment, PCB CAD system ID "pcad1", which has a mounting area check function when placing components, is used.

Selection of PCB CAD component number is a processing that uses two layers of PCB specification information and mounting condition information described in determination material 041 and determination material configuration code 042 as an example.

FIG. 5 shows table 031 for setting an operation generation for each organization that is an "operation management unit" of IT system to be used. Division code 051 "wd" of PCB designer, department code 052 "e_des1", and operation generation 054 "edes_002" for update section 053 "latest" (one with larger numerical value) are referenced. Description proceeds as an example assuming that PCB design department "e des" is divided into "e_des1" to "e_des4" by product classification which they are in charge of, where "e_des1" is currently introducing mounting area check function of PCB CAD and testing four other items, "e_des3" is currently introducing component angle check function test, and other PCB design departments are using function setting environment of operation generation "at the start of operation".

This table configuration makes it possible to test and evaluate in an environment set for each department in response to different requests of each department involving introduction of new tools and new functions, and enables evaluation-introduction of IT tool with high accuracy using actual work environment and with high efficiency by evaluation work sharing. After completing tests, it is also possible to newly register operation generation "edes_004" integrally setting the respective functions to deploy it to all of the PCB design departments at one time. The contents in the comments column are for reference when editing the table and are not involved in actual processing, so the description thereof is omitted.

FIG. 6 shows table 032 for managing all functions used in a department in association with each operation generation. Function setting overall code 065 "macse1002" for integrally managing function setting information is referenced according to operation generation 054 "edes_002", function code 061 (PCB CAD component number selection="macsel"), function generation 062 "latest" (larger numeral value when a plurality of rows are set) representing the revision of individual function setting, and setting switching section 063 ("–" is ignored).

In this embodiment, operation generation 054 is associated with seven functions including creation of BOM from the schematic and PCB CAD component number selection from the BOM, and "function setting overall code 065" is associated with function processing related to each function, information processing, and setting information related to tools and IT system cooperation control, thereby enabling the individual function management and the cooperation management between functions with operation generation set as one unit.

Function generation 062 exist for a change not as large as to increment operation generation but to respond to a minor change to be managed, and the numerical value of function generation 062 is incremented to allow the setting of new function setting overall code 065. When a plurality of function generation 062 is set for operation generation 054 and function code 061, the one with the larger numeral value is to be processed. Description related to "operation" such as standards for incrementing operation generation is omitted.

For setting switching section 063, there may be a case where the component numbers to be selected is to be changed significantly depending on the "destination of a product", for example, as a request for BOM creation processing from the schematic. setting switching section 063 is used to switch all of a series of table settings including the configuration of determination materials when it is "Not enough to deal with" only by changing the importance of determination materials and the request setting for each of determination materials, and "selection" is possible by displaying setting contents 064 only when setting switching section 063 is set, and the processing is executed according to the setting associated with the function setting overall code of the selected record.

Function generation 062 is supplementarily described. The reason why both "0" and "1" exist in function generation 062 of function code 061 "bomcre" is that there was a minor change in "bomcre" after the operation generation was set to "edes_002". The reason why function generation 062 is "0" although function setting overall code 065 of function code 061 "macsel" is incremented to "macse1002" is because the change to "macse1002" was determined to require management by operation generation, and the setting was changed simultaneously with the increment of operation generation 054, and therefore additional number "0" was set.

FIG. 7 shows a table 033 for executing processing according to the setting contents of process setting 072, process setting 073, and process setting 074 for each processing set in function setting overall code 065 "macse1002" and process code 071 (process code determined by the function). The number of process settings actually used varies depending on the processing of process code 071. When a plurality of records of the same process code 071 are set, all the set process codes are to be executed.

Process setting 072 in this embodiment indicates the target system, and description proceeds provided that path setting, login ID, password, option designation, and the like are managed by tables on the work support IT system side, or environment variables or the like.

Process code 071 "jcsettb1" is a processing that refers to process setting 073 (target table) "table 012" of process setting 072 (target system) "dbsvr1", and process setting 074 (reference column name) is set to "jcset02". Other process codes 071 also execute determined processing for each process setting.

"Pcadlib" sets components library used by PCB CAD system, and PCB CAD system ID to be used in this embodiment is "pcad1", and therefore, process setting 072 (target system) is the components library used by process setting 073 (library to be used) "pcad1_lib" of record of "pcad1".

"Pcadbin" sets an execution program for PCB CAD system. process setting 072 (target system) is "pcad1", and process setting 073 (execution program name) is set to "pcad1_set02.exe" and process setting 074 (maintenance status determination condition) is set to "------0---".

"Pcad1_set02.exe" is a program to be executed for PCB CAD file to be processed by PCB CAD server for "pcad1", and the program is executed after PCB CAD file creation is normally completed. The processing is necessary for switching the function of PCB CAD on a file-by-file basis, and description proceeds provided that the processing is executed in an environment where it is possible to refer to table 033 and table 011: item requiring correction 123 in FIG. 12 from the PCB CAD server.

The processing is to check the maintenance status of PCB CAD components and set the mounting area check function for the PCB CAD file to be processed based on the result. For example, if there are 20 kinds of PCB CAD components selected by the processing of this embodiment to be used in the PCB CAD file, the maintenance status determination condition "------0---" of the PCB CAD components which is registered in process setting 074 of table 033 in FIG. 7, is referred and compared with item requiring correction 123 of table 011 in FIG. 12 when selecting the 20 kinds of PCB CAD component numbers. The "–" digit is ignored and when the registration status flag of the mounting check area is the same as the value of the maintenance status determination condition (in this embodiment, the 7th digit from the left is "0"), a setting processing is executed to enable the use of the mounting check function for the PCB CAD file to be processed. When the 7th digit is other than "0" (unprepared situation in which the information necessary for mounting check is not set), the mounting check does not operate normally, therefore error information is output and the processing is aborted.

Process code 071 "dataref" indicates a reference destination of information served as a determination material used by determination processing, and it refers to process setting 073 (target table) "refdata" process setting 074 (reference column name) "(s) operation generation 054" in process setting 072 (target system) "dbsvr3" in. "(s)": represents an example when the string type is set, the "variable value" of the variable name "operation generation 054" used in the processing is defined as the column name, and used to refer to the necessary information.

Next, the processing of creating a PCB file designating the operation generation is described below. It is assumed that the PCB CAD file to be created is associated with the data for managing PCB attributes, and when the PCB CAD file creation is normally completed, the values of operation generation 054, function code 061, and function generation 062 used for processing are to be registered in the PCB management data.

The processing of creating a PCB CAD file using PCB CAD component number selection is based on the processing by the latest operation generation for both new processing and reprocessing, but in the case of "Reprocessing", it is possible to select any one from among the processing by the latest operation generation, the processing by the function setting overall code 065 referred to based on operation generation 054, function code 061, and function generation 062 registered in the PCB management data, and the processing performed by selecting function setting overall code 065 associated with operation generations available to the department displayed on a screen. In any case, if setting switching section 063 is set, setting contents 064 are displayed, and the processing is executed according to function setting overall code 065 of the selected record.

When the processing to select function setting overall code 065 associated with the operation generation is selected, table 032 of FIG. 6 is referred based on all operation generations referenced to by division code 051 and department code 052 set in table 031 of FIG. and then operation generation 054, setting contents 064 and comments of setting contents are displayed on the screen with reference to all records related to function code 061 of the corresponding processing. Registering information on function setting overall code 065 associated with the available operation generation in comments of the setting contents makes it possible to execute the processing by selecting desired function setting overall code 065.

These tables are not dedicated for PCB CAD component number selection, but are used to enable IT system with a plurality of functions to ensure consistency and to aid stable information processing in units of operation generations and function generations, even varying in operation and system environment, and are commonly used as a mechanism for managing functions, information processing, process settings for controlling system cooperation, and the like.

FIG. 8 shows table 012 for setting the importance of determination material configuration code and determination grounds information. process codes 071 "jcsettb1" and "jritb1" in FIG. 7 are "table 011" and "table 012" necessary for determination processing, and process setting 074 is not set for "table 011". process setting 074 "jcset02" is set in "table 012", and table 012 of FIG. 8 is referenced based on determination material 041 and determination material configuration code 042 in this embodiment, and then the "importance" of configuration code importance 081 is referred. The set importance is not only the importance set for each of determination material configuration codes 042, but also represents an importance ratio between the determination material configuration codes 042.

The program for determination processing is executed by reading all layers for determination material configuration, and since determination processing is eventually executed based on the settings of determination material 041 and determination material configuration code 042 even if the layer such as the major category of determination material is added at the highest layer, it is possible to make layers of determination material configuration easy for people to understand without changing the program.

An overview of the importance setting value of this embodiment shown in FIG. 8 is described below. In selecting PCB CAD components, the importance of configuration code importance 081 is set high based on the judgment that component through section and soldering section of determination material 041 are deeply related to design specifications of important land portions.

In particular, for PCBs that allow component mounting called "component through", PCB CAD components dedicated for component through are registered to ensure the peel strength of component land portions and to prevent solder bridges, and on the premise that the highest priority is to given to the use of PCB CAD components dedicated for component through for PCBs that allow component through (component through specification; T), the importance value is set to the highest and those of soldering section is set to the second.

Since plate making section "PHT" and "PRT" do not change land specifications as much as soldering section, the importance value for plate making section is set to lower than that for soldering section, and the importance value for mounting density section is set low because there is no problem in selecting registered PCB CAD components by referring to them in order from high-density mounting to low-density mounting after hole specifications and land specifications for PCB CAD components are determined.

The value of configuration code importance 081 in the embodiment can be set for each of determination material configuration codes 042, however, it is recommended to set the same importance value for each determination material at the layer of determination material 041 and to change it when the adjustment at the layer of determination material configuration code 042 is required, until user get accustomed to adjust the relationship between importance setting and output result.

The meaning of setting is described below by taking "plate making section" of determination material 041 as an example because it is important to understand the meaning of determination processing and table setting in order to introduce determination processing to work that requires determination.

For PCB of the embodiment, a requirement is set as "desiring to use" determination grounds Information 082 "P" (PCB CAD components for design dedicated for photographic process), "C" (PCB CAD components using both for photographic process and printing process), and "I" (PCB CAD components dedicated for printing process) which represent the features and performance (design specifications) of PCB CAD components desired to be used in determination material configuration code 042 "code PHT" (plate making section: a PCB by photographic process).

It is possible to set a plurality of determination grounds information such as "P, C" with a separator, numerical designation "0850", or to specify a range by a predetermined rules such as alphabets designation "A-D" (which means A, B, C, and D). In the selection processing of PCB CAD components, different importance setting is necessary for each determination grounds information, thereby a plurality of settings are not used in this embodiment.

Determination grounds information importance 083 represents what should be preferentially used in set determination grounds information 082 by importance value, and "P" is set for use at the importance "60", and similarly, "40" for "C", "20" for "I". The determination grounds information 082 "I" is a specification that is set for the purpose of completing the creation of a PCB CAD file with netlist and starting PCB design at an early stage, although it is not desired to be used for "PHT" (a PCB by photographic process). "I" is allowed to be used when "P" and "C" are not registered, and it is set on the premise that it is possible to take measures such as postponing the placement of PCB CAD components with "I" when designing a PCB, and replacing them immediately after the registration of "P" or "C" is completed (according to the request for replacement by message 085). The description for other determination material settings is omitted, since the processing concept is the same.

Temporary selection flag 084 indicates whether or not a series of sets of requests and importance set in process setting 074, determination material 041, determination material configuration code 042, configuration code importance 081, determination grounds information 082, and determination grounds information importance 083 are "temporary" selected, and temporary selection flag 084 "0" is normal selection and "1" is temporary selection.

For example, a "determination grounds information" indicating a PCB CAD component in which only information on the terminals and the number of pins necessary for capturing a netlist is registered is set to determination grounds information 082 and determination grounds information importance 083 in table 012, determination grounds information importance 083 is set to the lowest in the same determination material configuration code 042, and furthermore the temporary selection flag 084 is set to "1", whereby enable to early start PCB design by reliably creating the PCB CAD file with netlist, as well as to request early registration of the PCB CAD component by sending a message prompting to register it to the registration management department.

Also, by a mechanism that compare PCB CAD component numbers, as determination processing result, selected by temporary selection flag "0" (normal selection) with PCB CAD component numbers used in the PCB CAD file, the PCB CAD file using "temporarily registered PCB CAD component numbers" can be extracted. Based on this result, it is possible to prevent outflow of temporarily registered PCB CAD components by making a determination whether or not to output the PCB CAD file.

Message 085 is output when a message is registered, a request to register the PCB CAD component and a message prompting early replacement, and the like can be set. As for the method of outputting messages, it is possible to deal with automatic e-mail sending or PDF output by adding columns that designate the related department codes and the corresponding processing method to the table, but it is not a function directly related to determination processing, therefore description is omitted.

FIG. 9 shows a list of combinations of determination grounds information 082 set in the determination material configuration code 042 of this embodiment. The combinations of types of determination grounds information 082 set for each code of determination material configuration codes 042 are, 2 for soldering section, 3 for plate making section, 2 for mounting density section, and 2 for component through section, thus it's total is 2×3×2×2="24".

In order to select PCB CAD components having the optimal specifications to be mounted on the PCB to be processed for determination as a comprehensive determination result of a plurality of determination materials, the processing is needed to sort combinations of determination grounds information 082 in the "selection priority order" to be used, and to search table 011 in descending priority order of the combinations, which has the association between combinations of determination grounds information and determination result information.

FIG. 10 shows a "result" of sorting combinations of determination grounds information 082 in the selection priority order, and its processing is described below.

A series of sorting processing is described for plate making section 092, and description is omitted for soldering section 091, mounting density section 093, and component through section 094 because the processing is the same.

The following three contents are shown in the columns of plate making section 092 to be described.

(1) The numeral after the characters "configuration code importance:" represents the "value" of configuration code importance 081 set in table 012 of FIG. 8.

(2) The column of "determination grounds information" represents types of determination grounds information 082 set for determination material configuration code 042 (PHT in this embodiment,) in table 012 of FIG. 8, and the column of "determination grounds information importance" represents the "values" of determination grounds information importance 083.

(3) The column of the "configuration level importance (product)" represents the product of each "value" in the column of determination grounds information importance and the "value" of configuration code importance.

The value of configuration code importance 081 in table 012 of FIG. 8 represents the importance of each of determination material configuration codes 042, and it also represents a ratio of the importance of each determination material configuration code 042 to the overall importance of determination material configuration codes 042 by setting importance values for all determination material configuration codes 042, and values of configuration level importance (product) represent results of converting determination grounds information importance 083 into the overall level of importance of determination material configuration codes 042 by calculating "multiplication" of each value of determination grounds information importance 083 with the value of configuration code importance 081.

The configuration level importance (product) indicates determination grounds information importance for each determination material configuration code 042 which is the minimum configuration unit of set determination material, and in order to sort the "combinations of determination materials of determination grounds information 082" in importance order, it is necessary to calculate an importance value that integrates the values of each configuration level importance (product) of soldering section 091, plate making section 092, mounting density section 093, and component through section 094. The calculation for integrating them in this embodiment uses "addition", and the result is the '(sum) of overall importance (product)' 102. FIG. 10 shows a list in which the "combinations of determination grounds information 082" are sorted in descending order of numerical values and is assigned numbers of selection priority order 101. Data of the combination list of the sorted determination grounds information (hereinafter, referred to as "search source data") is stored in storage device and used for the subsequent processing.

FIG. 11 shows an example of component master in which "component numbers" of components to be mounted on PCB which is listed in BOM 034 and the information related to the components are registered, and hereinafter, the processing related to the component master is described below because PCB CAD component number selection processing is a processing that selects component numbers of all PCB CAD components to be mounted on PCB.

BOM is assigned unique symbol numbers called reference numbers, and PCB CAD components to which respective reference numbers are assigned are captured in a PCB CAD file. Although it is possible to execute PCB CAD component number selection processing for each reference number, it is necessary to execute the processing for the number of components to be mounted, and therefore, components with the same component number 111 and the same packing style 112 are treated as one variety, and PCB CAD component number selection processing is executed for the number of varieties of components to be mounted, and the processing of associating the selected PCB CAD component numbers with the respective reference numbers is executed by referring to the "data of BOM 034" with respect to the processing results. Assignment of reference numbers is executed after selection of PCB CAD component numbers, description of processing related to reference numbers is omitted.

Description of PCB CAD component number selection processing is described below on three components with component numbers 111 "R02-3333-05", "R02-7777-05", and "R02-9999-05" shown in FIG. 11 as component numbers listed in BOM.

The component master of the embodiment is a database in which the component information is collected using component numbers 111 and packing style 112 as unique keys. components are mounted manually or using production facilities, thus depending on the mounting method, it is necessary to select components that are delivered fixed on tape or delivered in pieces, which is classified as packing style 112.

Many of components to be mounted on PCB do not change in shape and size even if values of constants 113 and rating 114 are somewhat different, therefore, the number of registered PCB CAD components can be reduced by determining rules for aggregation. The target code 115 is a set of rules for aggregating component mounting classifications, mounting means, shapes, and sizes so that PCB CAD components can be aggregated according to these rules. In the embodiment, the conditions of "surface mount component", "machine mounting", "shape", and "size" are aggregated by "SMS 1005", and "SMS 1005" is set for target code 115 for all records whose unique keys are component number 111 and packing style 112 that match these conditions.

This target code 115 eliminates the need to set the table for determination materials related to "component mounting classification", "mounting means", "shape", and "size". Similar rules for aggregation is applied to lead components with target code 115: LMA9020 is set for mounting machines and LHA9020 is set for hand mounting, both of which aggregate "lead component", "each of above mounting means", "shape", and "size".

Although determination material 041 in this embodiment has only four types, four conditions are aggregated by target code, therefore, processing of selecting PCB CAD component numbers is substantially executed with eight determination materials. In real operation, to realize selection of PCB CAD component numbers with more optimal specifications, and to enable narrowing down determination materials before starting determination processing by having information other than table settings to narrow down determination materials, lead to a reduction in the number of determination materials to be set in the table.

For the three components mentioned above, as the selection of the PCB CAD component number for one component is completed, moving on to processing for the next component number 111 in turns, and when processing for all component numbers 111 are completed, the results of determination processing are output.

First, target code 115 "SMS1005" is referred for component number 111 "R02-3333-05".

FIG. 12 shows the result of referring to table 011 with target code 115 "SMS1005". table 011 is a database that integrates a series of information related to PCB CAD components, in which all PCB CAD component numbers are registered and associated with determination grounds information of target code 115, soldering section 091, plate making section 092, mounting density section 093, and component through section 094 as unique keys. In determination for selecting PCB CAD components of this embodiment, target codes 115 and all of determination material section are set as unique keys, but it is also possible to set a table for outputting a plurality of determination result information for the same combination of target code 115 and determination grounds information depending on request contents of determination work.

Target code 115 "SMS1005" is a code indicating a surface mount component, and component through section is set to "N" (no using component through) because its mounting method is not using component through holes. A total of five combinations of determination grounds information are registered as "SMS1005", although two of them are maintenance status 122 "4" which means in a temporary registration state, since process section 121 "1" which means to be subject to determination processing is set, all records of "SMS1005" referred here are subject to processing.

Item requiring correction 123 is used for the purpose of representing contents to be corrected by numerical values and codes of each digit, and the message 125 is used for outputting a message such as necessary response when it is registered. Description of output method is omitted.

An example of a specific use of process section 121 is introduced below. For example, when a mounting trouble occurs in a manufacturing department, and the cause is in design specifications for a PCB CAD component, furthermore such a trouble may occur in other PCBs, the value of process section 121 of the corresponding PCB CAD component number 124 in determination processing table 011 is changed to "0" (out of processing). Since the same PCB CAD component number may be used for other combinations of target codes and determination grounds information due to operation, the value of process section 121 of the combination record of the target code and the determination grounds information determined to cause the similar trouble, is changed to "0".

This can prevent new creation of PCB CAD files using the PCB CAD component associated with the combination of the target code and the determination grounds information which causes the trouble, without requiring any correction of the program, and can also prevent recurrence of the trouble due to output of PCB CAD files under design which may cause recurrence of the trouble, by using a mechanism for checking PCB CAD components and output determination process of PCB CAD files based on the checking result.

In order to output a PCB CAD file in this status, it is necessary to set the value of process section 121 to "1" (to be processed) after the troubleshooting of the PCB CAD component is completed, then to replace the PCB CAD component on CAD, furthermore, to execute the mechanism for checking the PCB CAD component, finally to output the PCB CAD file through output determination process.

When a new PCB CAD file is needed to create, the PCB CAD file can be created and its design can be started without causing any delays by registering temporary components with only pin settings (maintenance status 122 is "4"), and setting them as to be processed for selection (process section 121 is "1").

Next, processing of searching table 011 based on combinations of determination grounds information is described below. Based on component number 1111 "R02-3333-05", target code 115 "SMS1005", and determination grounds information for each of determination materials with a first priority level in selection priority order 101 stored in search source data (storage contents of FIG. 10), a set of the target code 115 and the determination grounds information for each of determination materials is searched in table 011, and when matched record is referenced, a series of information of the referenced record and the necessary information defined as function request are output as determination processing result to the storage device. When any matched record is not referenced. or when process section 121 is "0", "–" is set in selection priority order 101 as "reference error process", and output processing is executed in the same manner as in the case where matched record is referenced.

Subsequently, numeral of selection priority order 101 of the search source data is incremented, and processing from searching to outputting is executed in the same manner, and this is repeated until the last record of selection priority order 101. Although, in this embodiment mentioned above, a series of information are output regardless of whether or not a combination of determination grounds information is referenced, it is also possible to output a PCB CAD component number at the stage where the PCB CAD component number is first referenced in a search in which selection priority 101 is sequentially incremented, and then to proceed for the next component number.

FIG. 13 shows a series of processing results that output PCB CAD component numbers for SMS1005. selection priority order 101 "13" indicates that all of the determination grounds information for each determination material section for which selection priority order 101 of the search source data is "13"th is matched, and the same applies to other selection priority orders 101 "16" and "18". Among all outputs for target code 115 "SMS1005", PCB CAD component number 124 "4000" of the record with minimum numeral in selection priority 101 is used for creating a PCB CAD file of this embodiment.

The combinations of determination grounds information existing in the search source data may not exist in the record of target code 115 "SMS1005" in table 011, because the number of combinations of determination grounds information registered in "SMS1005" in table 011 is equal to the number of PCB CAD components actually registered, whereas the search source data is searched based on all combinations of "determination grounds information" including next candidate settings when there is no registration and settings of replacement premise.

FIG. 14 shows the result of referring to table 011 with target code 115 "LHA9020" for component number "R02-7777-05" and target code 115 "LMA9020" for component number "R02-9999-05" in BOM 034. Since processing is the same for both target codes, the processing for target code 115 "LHA9020" is only described below.

Based on target code 115 "LHA9020" and determination grounds information for each of determination materials with a first priority level in selection priority order 101 in the search source data, a set of the target code 115 and the determination grounds information for each of determination material section is searched in table 011, and when matched record is referenced, a series of information of the referenced record and the necessary information defined as function request are output as determination processing result to the storage device. When any matched record is not referenced, or when process section 121 is "0", "–" is set in selection priority order 101, and output processing is executed in the same manner as in the case where matched record is referenced.

Subsequently, numeral of selection priority order 101 is incremented, and processing from searching to outputting is executed in the same manner, and this is repeated until the last record of selection priority order 101. FIG. 15 shows this processing results that output PCB CAD component numbers for LMA9020 and LHA9020.

Selection priority order 101 "8" indicates that all of the determination grounds information for each determination material section for which selection priority order 101 of the search source data is "8"th is matched. Among all outputs of target code 115 "LHA9020", PCB CAD component number 124 "2000" of the record with minimum numeral in selection priority 101 is used for creating a PCB CAD file of this embodiment.

Next, moving on to component number 111 "R02-9999-05" with packing style 112 "M" of FIG. 11, description is omitted because processing is the same for it as described above. Finally, when the processing for all PCB mounted components in BOM 034 have been executed, the determination processing is completed.

FIG. 16 shows table 012 of FIG. 8 in which the values of determination grounds information importance 083 are respectively changed from "40" into "70" for determination grounds information 082 "D" of determination material configuration code 042 "R/D" of determination material 041 "soldering section", similarly, from "40" into "80" for determination grounds information 082 "H" of determination material configuration code 042 "MT-H", and from "20" into "10" for determination grounds information 082 "M".

FIG. 17 shows a result of resorting "combinations of determination grounds information" of respective determination materials which are generated based on the above request settings for each determination material in selection priority order. Only for soldering section 091 and mounting density section 093, determination grounds information is listed in selection priority order in the center column after importance change, and in the left column before importance change. Changing the importance settings affects the selection priority order of each determination grounds information, among them, as for changes in determination grounds information with increased importance, only the determination grounds information are indicated in black background where changes appeared in top part of the selection priority order.

The selection priority order is raised for determination grounds information both "D" in soldering section 091 and "H" in mounting density section 093 as a result of their increased importance. As for determination grounds information "P" in plate making section 092, the selection priority order which is "2"nd before the change is lowered to "6"th by this change as enclosed by the double ruled line of the combination of determination grounds information "RD", "P", "M" and "T". This is because the Order as a combination is relatively lowered by the greatly increased importance of soldering section 091 "D" and mounting density section 093 "H". And there is no change in component through section 094 because determination grounds information importance "T" is set as the highest priority, whereas "N" is set far lower than that and results in not the situation change.

As described above, a "combination of determination grounds information" in each determination material has both the importance for each determination material and the importance as the combination, and therefore, it is necessary and important to make confirmation after changing the setting, because when one of the settings is raised, other settings may be relatively lowered.

Description of PCB CAD component number selection processing is concluded, and the method of importance processing is supplementarily described. Although the embodiment shows a processing that the importance calculated by "weighting" is treated, combination of determination grounds information can also be generated by "priority order" setting of determination materials and "priority order" setting of determination grounds information.

However, the processing in the above priority order, like a conditional branch of a program, cannot properly reflect the influence of the request that each determination grounds information has on determination result after the first branching of determination material configuration codes in its priority order. Processing by importance (weighting) is essential for information processing of a work requiring "determination" that properly reflects all requests for a plurality of determination materials and for each determination material.

INDUSTRIAL APPLICABILITY

The present invention can be used regardless of industry types, work to be processed, purpose of use, and the like as long as the information processing that seeks the results of comprehensive determination processing based on a plurality of determination materials. Furthermore, the present invention can improve the determination accuracy by accumulating and correcting information that leads to determination in each table used for determination processing, similarly to experience value information that serves as a ground when people make determination. The present invention might be used like an AI that executes processing similar to human determination by increasing the number of determination processing to be processed and tables necessary for processing, and by having association among tables and among determination grounds information, in the similar manner as human gains experience.

REFERENCE SIGNS LIST

011 Table
012 Table
013 Processing
014 Processing
015 Result
016 Calculation
017 Calculation
021 PCB Management Data Registration
022 PCB CAD File Creation
023 PCB CAD Component Number Selection Processing
031 Table
032 Table
033 Table
034 BOM (Bill Of Materials)
041 Determination Material
042 Determination Material Configuration Code
051 Division Code
052 Department Code
053 Update Section
054 Operation Generation
061 Function Code
062 Function Generation
063 Setting Switching Section
064 Setting Contents
065 Function Setting Overall Code
071 Process Code
072 Process Setting
073 Process Setting
074 Process Setting
081 Configuration Code Importance
082 Determination Grounds Information
083 Determination Grounds Information Importance
084 Temporary Selection Flag
085 Message
091 Soldering Section
092 Plate Making Section
093 Mounting Density Section
094 Component Through Section
101 Selection Priority Order
102 (Sum) of Overall Importance (Product)
111 Component Number
112 Packing Style
113 Constant
114 Rating
115 Target Code
121 Process Section
122 Maintenance Status
123 Item Requiring Correction
124 PCB CAD Component Number
125 Message

The invention claimed is:

1. A method for information processing that enables computerization of a work requiring a determination result in which all requests related to a plurality of determination materials are reflected, the method comprising:

(a) a step of generating, based on said requests, all combinations of information serving as grounds for said determination result (hereinafter, referred to as "determination grounds information"), which are set for each minimum configuration unit of a determination material of said plurality of determination materials (hereinafter, referred to as "determination material configuration code");

(b) a step of causing a computer to calculate an overall importance level for each of generated said all combinations of said determination grounds information by combining and calculating:

(i) a first importance level consisting of a determination grounds information importance set for each of said determination grounds information; and (ii) a second importance level consisting of a determination material configuration code importance set for each of said determination material configuration code;

(c) a step of causing the computer to rearrange generated said all combinations of said determination grounds information in order of the overall importance level based on calculated said overall importance level, and to store a combination list of the rearranged determination grounds information as search source data in a storage device;

(d) a step of causing the computer to search a database registered as a table that associates combinations of said determination grounds information with determination result information based on said search source data of said combination list of the rearranged determination grounds information, and to output the determination result information in importance order to said storage device; and (e) a step of causing a target IT system to automatically execute a specific function processing based on the outputted determination result information, thereby realizing automation of said work where a process proceeds based on a comprehensive determination result reflecting the plurality of determination materials.

2. The information processing method according to claim 1, wherein said processing of combining and calculating includes processing that adds a plurality of product values calculated by multiplication of said first importance level and said second importance level.

* * * * *